(12) United States Patent
Black et al.

(10) Patent No.: US 11,306,614 B2
(45) Date of Patent: Apr. 19, 2022

(54) SUMP AUXILIARY VENT SYSTEM

(71) Applicant: Rolls-Royce Corporation, Indianapolis, IN (US)

(72) Inventors: Joseph Black, Brownsburg, IN (US); Joseph A. Swift, Indianapolis, IN (US); Daniel Feinstein, Zionsville, IN (US); Jared Isamu Taketa, Avon, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 721 days.

(21) Appl. No.: 16/151,995

(22) Filed: Oct. 4, 2018

(65) Prior Publication Data

US 2020/0109646 A1 Apr. 9, 2020

(51) Int. Cl.
*F01D 25/18* (2006.01)
*F01D 25/12* (2006.01)
(Continued)

(52) U.S. Cl.
CPC ......... *F01D 25/183* (2013.01); *F01D 25/125* (2013.01); *F01D 25/162* (2013.01);
(Continued)

(58) Field of Classification Search
CPC .... F01D 25/183; F01D 25/125; F01D 25/162; F02K 3/06
(Continued)

(56) References Cited

U.S. PATENT DOCUMENTS 4,373,858 A 2/1983 Eastman
4,397,471 A * 8/1983 Feldman ............... F01D 11/025
277/412
(Continued)

FOREIGN PATENT DOCUMENTS

EP 2 657 464 A2 10/2013
EP 2 657 464 A3 5/2014
(Continued)

OTHER PUBLICATIONS

European Office Action, dated Jan. 25, 2021, pp. 1-7, issued in European Patent Application No. 19 196 668.8, European Patent Office, Munich, Germany.
(Continued)

*Primary Examiner* — Michael R Mansen
*Assistant Examiner* — Mark K Buse
(74) *Attorney, Agent, or Firm* — Crowell & Moring LLP

(57) ABSTRACT

A system includes an air chamber and an oil capture cavity. The air chamber includes an inlet to receive pressurized air from a gas turbine engine. The oil capture cavity is positioned between the air chamber and an oil sump supplying lubricating oil to the gas turbine engine. The oil capture cavity includes an auxiliary vent formed in a base of the oil capture cavity. A seal may separate the oil capture cavity from fluid communication with the oil sump. A nozzle provides fluid communication between the oil capture cavity and the air chamber. The nozzle is configured and positioned to direct a stream of the pressurized air into the oil capture cavity against an opposite wall of the oil capture cavity to create a quiescent zone at the base of the oil capture cavity. The quiescent zone includes the auxiliary vent.

19 Claims, 5 Drawing Sheets

(51) Int. Cl.
*F01D 25/16* (2006.01)
*F02K 3/06* (2006.01)

(52) U.S. Cl.
CPC .......... *F02K 3/06* (2013.01); *F05D 2220/323* (2013.01); *F05D 2240/54* (2013.01); *F05D 2240/55* (2013.01); *F05D 2260/213* (2013.01); *F05D 2260/605* (2013.01); *F05D 2260/98* (2013.01)

(58) Field of Classification Search
USPC ........................................................ 184/6.11
See application file for complete search history.

(56) References Cited

U.S. PATENT DOCUMENTS

| | | | |
|---|---|---|---|
| 4,891,934 A | 1/1990 | Huelster | |
| 5,218,816 A * | 6/1993 | Plemmons | F01D 11/02 277/419 |
| 6,330,790 B1 | 12/2001 | Arora et al. | |
| 6,511,228 B2 | 1/2003 | Dusza | |
| 6,761,034 B2 * | 7/2004 | Niday | F23R 3/286 60/796 |
| 8,210,316 B2 | 7/2012 | DiBenedetto et al. | |
| 8,366,382 B1 * | 2/2013 | Muldoon | F01D 11/02 415/111 |
| 9,822,817 B2 | 11/2017 | Price et al. | |
| 9,944,399 B2 * | 4/2018 | Desjardins | B64D 27/10 |
| 2003/0011135 A1 * | 1/2003 | Meacham | F16J 15/3404 277/408 |
| 2005/0132706 A1 * | 6/2005 | Fukutani | F02C 7/06 60/726 |
| 2013/0192238 A1 * | 8/2013 | Munsell | F02C 7/18 60/772 |
| 2013/0192239 A1 * | 8/2013 | Glahn | F01D 25/183 60/772 |
| 2013/0283757 A1 * | 10/2013 | Bordne | F01D 25/125 60/39.08 |
| 2014/0099188 A1 * | 4/2014 | Bordne | F01D 25/183 415/112 |
| 2014/0144121 A1 * | 5/2014 | Legare | F01D 25/162 60/39.08 |
| 2015/0315933 A1 | 11/2015 | Do et al. | |
| 2016/0146046 A1 | 5/2016 | Lighty et al. | |
| 2016/0356179 A1 * | 12/2016 | Tennevall | F01D 25/183 |

FOREIGN PATENT DOCUMENTS

| | | |
|---|---|---|
| EP | 3 111 056 A1 | 1/2017 |
| WO | WO 2015/128413 A1 | 9/2015 |

OTHER PUBLICATIONS

Extended European Search Report, dated Mar. 6, 2020, pp. 1-11, issued in European Patent Application No. 19196668.8, European Patent Office, Munich, Germany.

* cited by examiner

SUMP AUXILIARY VENT SYSTEM

TECHNICAL FIELD

This disclosure relates to gas turbine engines and, in particular, to a sump auxiliary vent system in gas turbine engines.

BACKGROUND

Gas turbine engines may include a compressor, a combustor and a turbine. Typically, the compressor is an air compressor rotating on a shaft of the engine to provide air for the combustion cycle. The air is provided to the combustor along with fuel where combustion occurs to create a high pressure, high temperature flow, which is provided to the turbine. The turbine may provide mechanical torque to the shaft and provides exhaust gas that creates thrust. The gas turbine engine typically includes bearings, such as shaft bearings that allow the shaft to rotate. Such bearings may be lubricated by bearing oil. The bearing oil may be distributed to one or more bearings from an oil sump(s). Seals may be used to stop leaking of the bearing oil around the shaft or other rotating parts of the gas turbine engine. An oil scavenge system may return bearing oil to the oil sump(s).

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

By way of an introductory example, a system includes a vent passageway formed in a support structure of a gas turbine engine. The system includes an oil capture cavity in fluid communication with the vent passageway via an auxiliary vent. The oil capture cavity includes a quiescent zone in a portion of oil capture cavity. The system includes an air chamber to receive pressurized air supplied by the gas turbine engine and a nozzle positioned between the air chamber and the oil capture cavity. The nozzle is configured to regulate a flow of pressurized air from the air chamber into the oil capture cavity. The system also includes a seal positioned between the oil capture cavity and an oil sump. The nozzle is configured to regulate the flow of pressurized air into the oil capture cavity to maintain a pressure differential between the oil sump and the oil capture cavity and a flow rate of pressurized air through the auxiliary vent and the vent passageway. The flow of pressurize air is directed by the nozzle to maintain the quiescent zone in the oil capture cavity.

An interesting feature of the systems and methods described below may be that flow of pressurized air that is directed by the nozzle into the oil capture provides an air curtain that forms the quiescent zone above the auxiliary vent. Alternatively, or in addition, an interesting feature of the systems and methods described below may be that the nozzle creates the quiescent zone with the flow of pressurized air in a non-rotational portion of the oil capture cavity such that oil and/or particulate included in the pressurized air is retained in the quiescent zone and enters the auxiliary vent.

Figure 1:
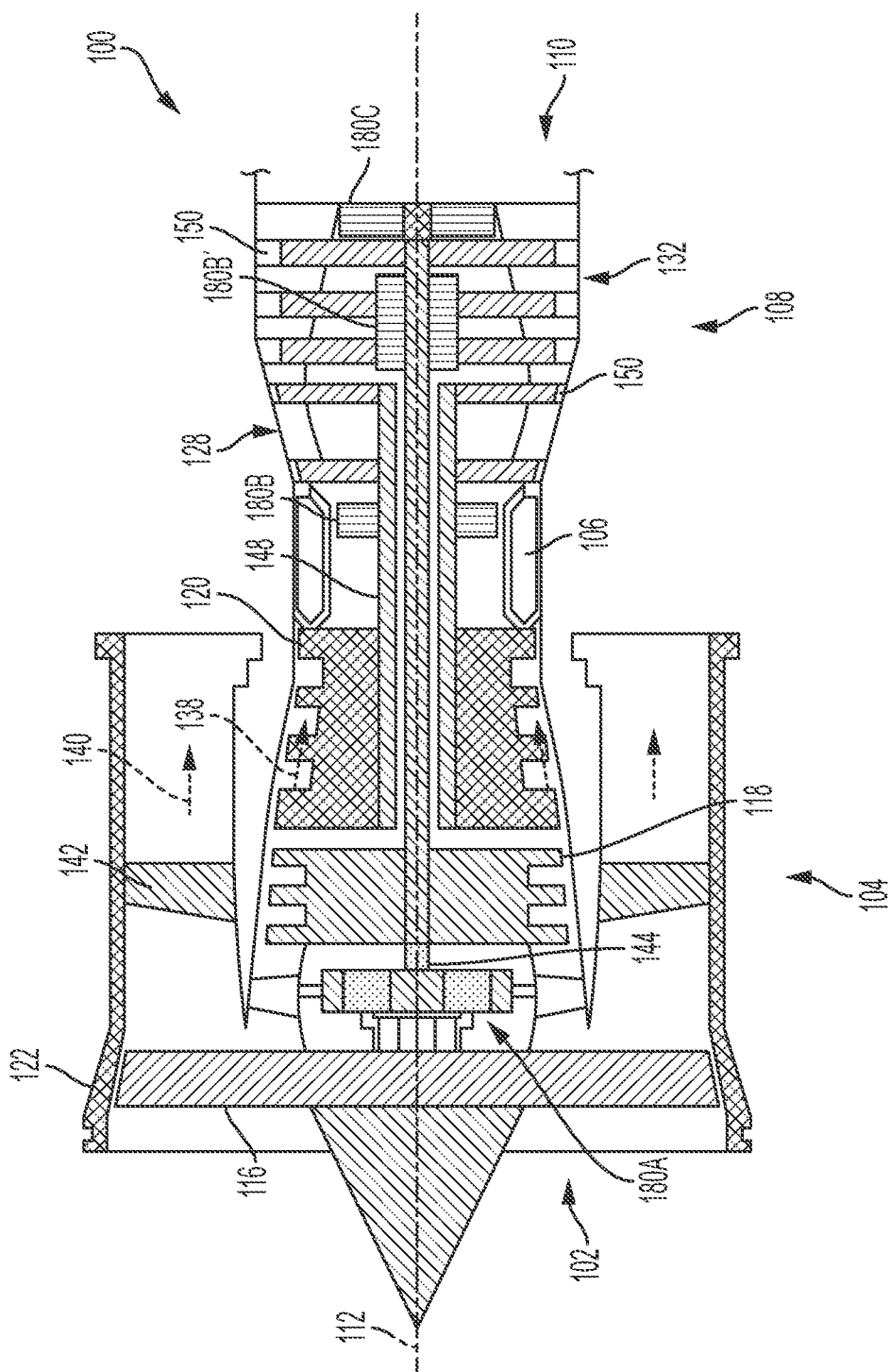
FIG. 1 illustrates a cross-sectional view of an example of a gas turbine engine.

FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned space vehicle, a fixed wing vehicle, a variable wing vehicle, a rotary wing vehicle, an unmanned combat aerial vehicle, a tailless aircraft, a hover craft, and any other airborne and/or extraterrestrial (spacecraft) vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted in the example of FIG. 1 as a ducted axial flow engine with multiple spools, in some forms the gas turbine engine 100 may have additional or fewer spools and/or may be a centrifugal or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an air intake 102, multistage axial flow compressor 104, a combustor 106, a multistage turbine 108 and an exhaust 110 concentric with a central axis 112 of the gas turbine engine 100. The multistage axial flow compressor 104 may include a fan 116, a low pressure compressor 118 and a high pressure compressor 120 disposed in a fan casing 122. The multistage turbine 108 may include a high pressure turbine 128 and a low pressure turbine 132.

A low pressure spool includes the fan 116 and the low pressure compressor 118 driving the low pressure turbine 132 via a low pressure shaft 144. A high pressure spool includes the high pressure compressor 120 driving the high pressure turbine 128 via a high pressure shaft 148. In the illustrated example, the low pressure shaft 144 and the high pressure shaft 148 are disposed concentrically in the gas turbine engine 100. In other examples, other shaft configurations are possible.

During operation of the gas turbine engine 100, fluid received from the air intake 102, such as air, is accelerated by the fan 116 to produce two air flows. A first air flow, or core air flow, travels along a first flow path indicated by dotted arrow 138 in a core of the gas turbine engine 100. The core is formed by the multistage axial compressor 104, the combustor 106, the multistage turbine 108 and the exhaust 110. A second air flow, or bypass airflow, travels along a second flow path indicated by dotted arrow 140 outside the core of the gas turbine engine 100 past outer guide vanes 142.

The first air flow, or core air flow, may be compressed within the multi-stage axial compressor 104. The compressed fluid may then be mixed with fuel and the mixture may be burned in the combustor 106. The combustor 106 may include any suitable fuel injection and combustion mechanisms. The resultant hot, expanded high pressure fluid may then pass through the multi-stage turbine 108 to extract energy from the fluid and cause the low pressure shaft 144 and the high pressure shaft 148 to rotate, which in turn drives the fan 116, the low pressure compressor 118 and the high pressure compressor 120. Discharge fluid may exit the exhaust 110.

As noted above, the hot, high pressure fluid passes through the multi-stage turbine 108 during operation of the gas turbine engine 100. As the fluid flows through the multi-stage turbine 108, the fluid passes between adjacent blades 150 of the multi-stage turbine 108 causing the multi-stage turbine 108 to rotate in a rotational direction. The blades 150 may rotate around an axis of rotation, which may correspond to the centerline or central axis 112 of the gas turbine engine 100.

Bearings may be positioned at various locations along within the core of the gas turbine engine 100 to allow rotation of the low pressure shaft 144 and the high pressure shaft 148. These bearings may be lubricated by lubricating oil circulated into one or more oil sumps to the bearings while the gas turbine engine 100 is operating. The gas turbine engine 100 may also include a sump auxiliary vent system 180.

The sump auxiliary vent system 180 may include a front auxiliary vent system 180A positioned between the front fan 116 and the low pressure compressor 118, a mid sump auxiliary vent system 180B positioned adjacent the combustor 106 between the high pressure compressor 120 and the multistage turbine 108, and an aft sump auxiliary vent system 180C positioned between the multi-stage turbine 108 and the exhaust 110. In other examples, one or more of the front, mid and/or aft sump systems 180A, 180B, and/or 180C may be omitted from the sump auxiliary vent system 180 resulting in any combination of one or more of the front, mid and/or aft sump systems 180A, 180B, and/or 180C being present in the gas turbine engine 100. For example, the aft sump auxiliary vent system 180C may be omitted. When the aft sump auxiliary vent system 180C is omitted, the mid sump auxiliary vent system 180B may be re-positioned in the gas turbine engine 100 to be in the multistage turbine 108 (indicated as 108B' in FIG. 1)

Figure 2:
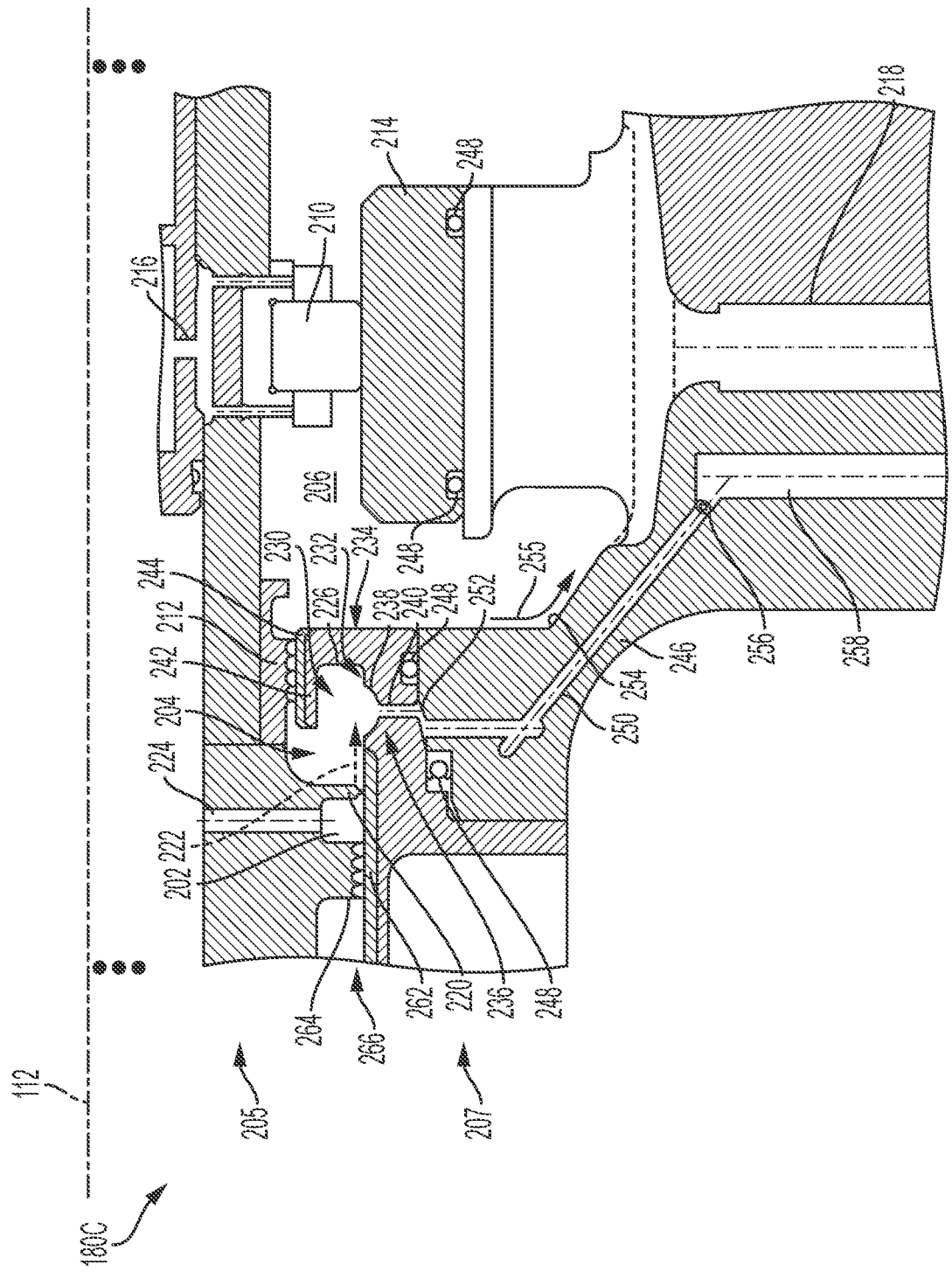
FIG. 2 is a cross-section side view of a portion of an example gas turbine engine illustrating an example aft sump auxiliary vent system.

FIG. 2 is a cross-section side view of a portion of an example gas turbine engine illustrating an example of an aft sump auxiliary vent system 180C. The aft sump auxiliary vent system 180C includes an air chamber 202 and an oil capture cavity 204. The oil capture cavity 204 is positioned between the air chamber 202, which is rotational with a rotational portion 205 of the gas turbine engine, and a stationary oil sump 206 included in a non-rotational portion 207 of the gas turbine engine. The oil sump 206 receives lubricating oil supplied to a bearing 210 which is rotational about the central axis 112 with the rotational portion 205 of the gas turbine engine. A seal 212 is coupled with the rotational portion 205 and separates the oil capture cavity 204 from fluid communication with the oil sump 206. The seal 212 may be a labyrinth seal, a carbon seal or another form of mechanical seal providing a restriction of fluid flow between the oil capture cavity 204 and the oil sump 206.

The bearing 210 is supported by a bearing race 214 located in the stationary portion 207. The bearing 210 may be supplied lubricating oil from an oil supply line 216 in the rotational portion 205, such as a shaft oil supply line. Lubricating oil supplied from the oil supply line 216 may be supplied to the bearing 210 and drain into the oil sump 206, where the oil may be evacuated via a scavenge line 218 by a scavenge pump (not shown). Oil evacuated via the scavenge line 218 may be liquid oil containing air or a mist of oil suspended in air, or some combination thereof. In addition to extracting air from the evacuated oil, the oil may also be cooled before being returned to an oil reservoir (not shown) for re-use to lubricate the bearing 210.

A nozzle 220 included in the rotational portion 205 provides fluid communication between the air chamber 202 and the oil capture cavity 204. The nozzle 220 is configured and positioned to direct a stream of pressurized air (illustrated by arrow 222) into the oil capture cavity 204. The pressurized air is supplied to the air chamber 202 via an air supply line 224. Pressurized air may be supplied, for example, via bleeds of the multistage air compressor 104 (FIG. 1), or some other source of pressurized air. The stream of air directed into the oil capture cavity 204 may be directed against a wall 226 of the oil capture cavity 204 that is opposite the location of the nozzle 220 so as to create a quiescent zone 230 in the oil capture cavity 204. The area of the quiescent zone 230 may extend radially inward from a base 232 of the oil capture cavity 204 toward the central axis 112.

The quiescent zone 230 may be an area within the oil capture cavity 204 that minimizes random air flow vectors and variable directions of air current. In addition, the velocity of the air flowing in the quiescent zone 230 may be lower and/or more unidirectional than air flowing in other parts of the oil capture cavity 204. Thus, particulate, such as oil, dust, soot or other minute material present in the oil capture cavity 204 may enter the quiescent zone 230 and stagnate or otherwise experience reduced velocity. As a result, the particulate may come to rest, such as by coagulation or otherwise combining, and precipitate out of the flow of pressurized air. In addition, due to the minimized random air flow vectors and minimized variability of air current directions in the quiescent zone 230, liquid such as oil that enters the quiescent zone 230 in the oil capture cavity 204 may be uniformly managed and directed.

The wall 226 and base 232 of the oil capture cavity 204 are formed as part of an annular structure 234 positioned in the stationary portion 207 of the gas turbine engine to be concentric with the central axis 112. An auxiliary vent 236 is formed in the base 232 within the quiescent zone 230. The auxiliary vent 236 may include a bowl 238 and a throat 240. In some examples, the bowl 238 and the throat 240 may be a series of notches concentrically positioned and sequentially formed in the annular structure 234. In other examples, the auxiliary vent 236 and bowl 238 may be circular, oval or some other shaped holes sequentially formed in the annular structure 234. In still other examples, the auxiliary vent 236 and bowl 238 may be continuous slots formed in the annular structure 234 with ribs or struts sequentially located and spanning the slots to uniformly maintain the structural integrity and position of the annular structure 234 on opposite sides of the slots. In yet other examples, the bowl 238 may be omitted.

The wall 226 of the oil capture cavity 204 may be continuously and circumferentially formed around the annular structure 234 to extend away from the base 232 inwardly toward the central axis 112. A flange 242 may be formed at an end of the wall 226 opposite the base 232. The flange 242 may be formed as continuous extension of the wall 226 and includes a sealing surface 244 formed on a surface of the flange 242 that is opposite a surface of the flange 242 forming an inboard wall of the oil capture cavity 204, where the base 232 forms the outboard wall. Thus, the flange 242 may be positioned inboard and circumferentially equidistant from the auxiliary vent 236. The sealing surface 244 is formed in the stationary portion 207 to be concentric with, and parallel to the central axis 112 so as to cooperatively operate with the seal 212 to minimize oil communication from the oil sump 206 into the oil capture cavity 204. The sealing surface 244 may be an abradable surface or coating, which is in contact with the seal 212.

The combination of the base 232, the wall 226 and the flange 242, are included in the annular structure 234, which may be included in the gas turbine engine as one monolithic structure, and which defines the quiescent zone 230. Accordingly, the quiescent zone 230 may be created by the flow of pressurized air to be defined by and positioned in the non-rotational portion 207 of the gas turbine engine, whereas the oil capture cavity 204 may be defined by both the rotational portion 205 and the non-rotational portion 207 of the gas turbine engine. In the illustrated example, the transition from the base 232 to the wall 226 and from the wall 226 to the flange 242 may be formed with a predetermined radius of curvature that contributes to minimization of random air flow vectors in the quiescent zone 230.

In an example, the stream of pressurized air provided by the nozzle 220 creates an air curtain above auxiliary vent between the nozzle 220 and the wall 226 that flow substantially parallel with the base 232. Upon striking the wall 226, the curtain of pressurized air is redirected by the predetermine radius of curvature to flow along (parallel with) the wall 226 toward the flange 242. Upon reaching the flange 242, the curtain of pressurized air is again redirected by the predetermine radius of curvature to flow along (parallel with) the flange 242 until contacting the nozzle 220 and being redirected back into the stream of pressurized air provided from the air chamber 202 as illustrated by arrow 222. Accordingly, a circulating flow of air within the quiescent zone 230 may perform a cyclonic separation of particulate through vortex separation. Such particulate and other fluids, such as pressurized air and oil, may be urged into the auxiliary vent 236 and confined therein by the curtain of air provided from the nozzle 220.

In other examples, other structures, geometries and/or configurations may be present, such as flanges, lips, fins, flow channels, walls, ridges, and the like to create and/or optimize quiescent conditions in the quiescent zone 230. For example, a lip may extend from the distal end of the flange 242 opposite the wall 226 toward the nozzle 220 or the auxiliary vent 236 or the base 232 to further direct air flow vectors. In addition, the geometry, such as the shape and size of the quiescent zone 230 may be adjusted according to the position of the nozzle 220, the velocity and directivity of the pressurized air from the nozzle 220 and other variables affecting the quiescent zone 230 by, for example, providing additional or different radii and/or angled surfaces defining the boundaries of the quiescent zone 230. The geometry of the quiescent zone 230 may be modified by, for example, modifying at least one of the rotating portion 205 or the non-rotational portion 207 that defines the oil capture cavity 204. In addition, or alternatively, the percentage of the rotating portion 205 or the non-rotational portion 207 forming the quiescent zone 230 or oil capture cavity 204 may be adjusted to optimize and/or reshape the quiescent zone 230.

The annular structure 234 may be sealed by o-rings 248 to a bearing support structure 246, to which the bearing race 214 is also sealed by o-rings 248. The bearing support structure 246 may be a rear turbine bearing support, and may be formed to include a vent passageway 250 in fluid communication with the auxiliary vent 236. In some examples, an entry slot 252 may be formed annularly in the bearing support structure 246 to channel the flow of pressurized air/oil/particulate to the passageway 250. The cross sectional area of the throat 240, the entry slot 252 and the vent passageway 250 may be sized to accommodate the maximum expected flow of air and/or particulate and/or other fluid and avoid coking of the oil therein. In an example, the bearing support structure 246 may be a cast structure formed with a vent passageway 250 that is between about 1 mm and 25 mm in width. In another example, the bearing support structure 246 may be a forged structure, and the vent passageway 250 may be a drilled hole that is between about 1 mm and 25 mm in diameter.

The vent passageway 250 may also be formed in the bearing support structure 246 to extend along the outer wall of the oil sump 206 so that heat included in the pressurized air (and particulate and oil) flowing in the vent passageway 250 may be transferred to the lubricating oil in the oil sump 206. In addition, lubricating oil in the oil sump 206 may be directed to flow along an outer wall 254 of the oil sump 206. The outer wall 254 may provide a heat exchanger function due to the proximity of the vent passageway 250 to the outer wall 254. Thus, the vent passageway 250 may be positioned in the bearing support structure 246 to extend along the outer wall 254 of the oil sump 206. The outer wall 254 of the oil sump 206 may provide a heat exchanger function to transfer heat out of the vent passageway and into lubricating oil in the oil sump 206. Lubricating oil in the oil sump 206 may be directed to flow along the outer wall 254 within the oil sump 206 as illustrated by arrow 255. The outer wall 254 may be conducive to heat transfer from the vent passageway 250 to the lubricating oil in the oil sump 206. In some examples, the outer wall 254 may include heat transfer features, such as fins, capillaries, heat conducting materials and the like to facilitate receipt of the heat from the vent passageway.

The volume of air flowing in the vent passageway 250 may be controlled with a flow regulator 256, such as a restriction orifice. The flow regulator 256 may be specifically designed to allow enough air flow to keep fluid, such as a mixture of oil and air flowing the bowl 238, the throat 240, the entry slot 252 and the vent passageway 250 without coking or otherwise significantly fouling any of these areas ahead of regularly scheduled maintenance, while avoiding excess air flow/loss. In FIG. 2, the restriction orifice 256 is disposed in the vent passageway 250 where the vent passageway 250 ends, or transitions, to an exhaust port 258 in order to be spaced away from the relatively hot area around the oil capture cavity 204. In other examples, the restriction orifice 256 may be positioned in other locations within the vent passageway 250. In still other examples, the cross-sectional area of the throat 240, the vent passageway 250, the exhaust port 258, or some other part of the flow path including and after the auxiliary vent 236 may include a flow restrictor. The exhaust port 258 may channel the flow of pressurized air (an oil) from the vent passageway 250 to, for example, the exhaust 110 (FIG. 1), overboard (external to the gas turbine engine), to an engine gear box, or to a removable capture location, such as a bottle or other container that can be emptied.

The annular structure 234 also includes a stationary floor 262 of the air chamber 202. Thus, the air chamber 202 may be an annular cavity concentric with the central axis 112 formed by the combination of the rotational nozzle 220, the stationary floor 262 and a seal 264. The seal 264 may be coupled with the rotational portion 205 of the gas turbine engine. The seal 264 may be a labyrinth seal, a carbon seal, or some other form of mechanical seal to minimize fluid flow between the air chamber 202 and a hot air cavity 266. The hot air cavity 266 may, for example, provide liquid communication with the combustor 106 (FIG. 1). Thus, oil that leaks through the seal 264 may cause a fire or coking in the hot air cavity 266.

The stationary floor 262 of the air chamber 202 uniformly and concentrically extends outboard of the seal 264, and under the nozzle 240 to form an annular flat surface with which the seal 264 is in rotational contact. The stationary floor 262 may be an abradable surface or coating, which is in contact with the seal 264. In addition, the nozzle 240 is positioned a predetermined distance from the stationary floor 262, such as from 0.5 mm to 15 mm, to regulate the flow, or velocity, of pressurized air into the oil capture chamber 204, and create the air curtain. In an example, the flow or velocity of pressurized air into the oil capture chamber 204 may be regulated to maintain a predetermined range of 1 to 50 PSID in the oil capture chamber 204. The pressurized air within the oil capture chamber 204 creates a differential pressure across the seal 212 to minimize leakage from the oil sump 206 into the oil capture cavity 212. Thus, the pressure in the oil capture cavity 212 will be maintained above the pressure in the oil sump 206.

The flow of pressurized air supplied by the nozzle 220 also positively pressurizes the auxiliary vent 236 so as to create a flow of pressurized air in the vent passageway 250. The flow of pressurized air flowing through the auxiliary vent 236 and the vent passageway 250 may be regulated by the flow regulator 256. Accordingly, the nozzle 220 may regulate the flow of air into the oil capture cavity 204 so as to maintain the predetermined pressure in the oil capture cavity 204 to sustain the differential pressure across the seal 212 while also sustaining a positive pressure and a corresponding predetermined flow of air through the auxiliary vent 236 and the vent passageway 250. Thus, the nozzle 220 is configured to pressurize the oil capture cavity 204 with respect to the seal 212 and the auxiliary vent 236 to discourage the flow of oil through the seal 212 into the oil capture cavity 204 and encourage the flow of air (along with any particulate or oil in the quiescent zone 230) through the auxiliary vent 236. The nozzle 220 may regulate the flow of air into the oil capture cavity to a predetermined flow rate that will balance the competing demands of adequate differential pressure across the seal 212 while also supplying an adequate flow of air to the auxiliary vent 236 without excessive air loss out the exhaust port 258. Thus the predetermined flow rate may be determined based on the expected pressure in the oil sump 206, and the flow rate of the flow regulator 256.

Figure 3:
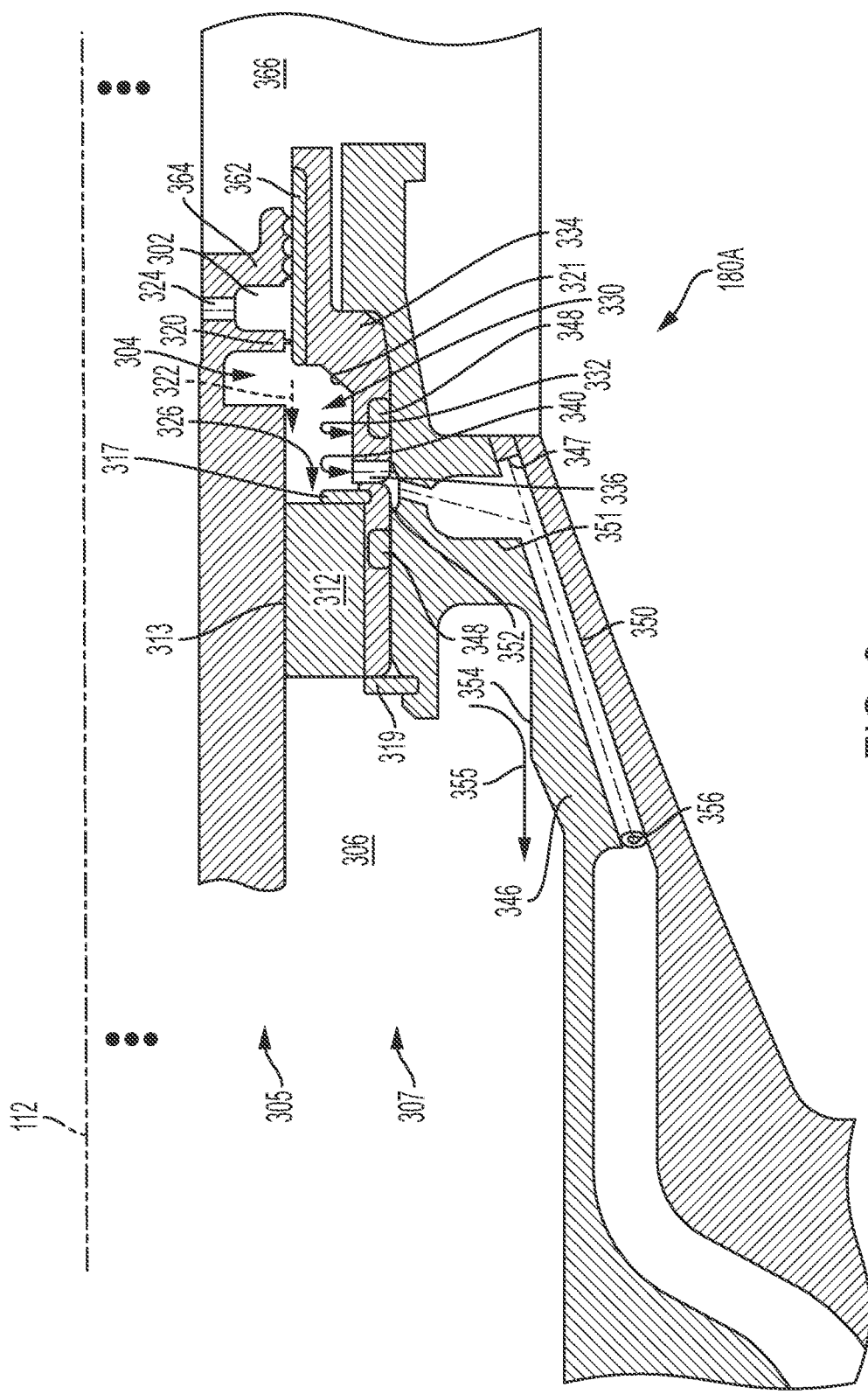
FIG. 3 is a cross-section side view of a portion of an example gas turbine engine illustrating an example of a front sump auxiliary vent system.

FIG. 3 is a cross-section side view of a portion of an example gas turbine engine illustrating an example of a front sump auxiliary vent system 180A. Unless otherwise indicated, the features and functionality of the front sump auxiliary vent system 180A and the rear sump auxiliary vent system 180C (FIG. 2) are similar. Accordingly, for purposes of brevity the details of these features and functionality will not be repeated, however, it should be understood that such features and functionality are fully interchangeable, combinable, and/or useable in either the front sump auxiliary vent system 180A or the rear sump auxiliary vent system 180C, unless otherwise indicated.

The front sump auxiliary vent system 180A includes an air chamber 302 and an oil capture cavity 304. The oil capture cavity 304 is positioned between the air chamber 302, which is rotational with a rotational portion 305 of the gas turbine engine, and a stationary oil sump 306 included in a non-rotational portion 307 of the gas turbine engine. A seal 312 is coupled with an annular structure 334 included in the non-rotational portion 307. The seal 312 separates the oil capture cavity 304 from fluid communication with the oil sump 306. The seal 312 may be a carbon seal, a labyrinth seal, or another form of mechanical seal providing a restriction of fluid flow between the oil capture cavity 304 and the oil sump 306. The oil sump 306 may receive lubricating oil from bearings (not shown) and include a scavenge line to extract oil returned to the oil sump 306 from the bearing with a scavenge pump. (not shown)

The seal 312 may be retained against a sealing surface 313 in the rotational portion 305. The sealing surface 313 may be steel or ceramic or other material. In some example, the sealing surface 313 may be an abradable surface or coating, which is in contact with the seal 312. A first retaining ring 317 may bias the seal 312 axially in a first direction on the annular structure 334. The first retaining ring 317 is positioned between the seal 312 and the oil capture cavity 304 in the stationary portion 307. A second retaining ring 319 in the oil sump 306 positioned on the opposite side of the seal 312 from the first retaining ring 317 biases the seal 312 axially against the annular structure 334 in a second direction opposite the first direction. Thus, the first retaining ring 317 and the second retaining ring 319 provide equal and opposite bias parallel to the central axis 112 to axially maintain the seal 312 on the annular structure 334.

The annular structure 334 is axially concentric with the central axis 112 in the non-rotational portion 307 of the gas turbine engine. O-rings 348 provide a seal between the annular structure 334 and a bearing support structure 346. A base 332 of the oil capture cavity 304 is provided by a portion of the annular structure 334. The annular structure 334 also provides a stationary floor 362 under a nozzle 320 and a seal 364.

The nozzle 320 is included in the rotational portion 305 and provides fluid communication between the air chamber 302 and the oil capture cavity 304. The nozzle 320 is configured and positioned to direct a stream of pressurized air (illustrated by arrow 322) into the oil capture cavity 304. The pressurized air is supplied to the air chamber 302 via an air supply line 324. Pressurized air may be supplied, for example, from one or more bleeds from the multistage air compressor 104 (FIG. 1), or some other source of pressurized air. The nozzle 320 may be a predetermined distance, such as such as from 0.5 mm to 15 mm, from the stationary floor 362 so as to provide a regulated flow, velocity, of pressurized air. The stationary floor 362 may be an abradable surface or coating, which is in contact with the seal 364.

The stream of air directed into the oil capture cavity 304 may be directed against a wall 326 of the oil capture cavity 304 that is opposite the location of the nozzle 320 so as to create a quiescent zone 330 in the oil capture cavity 304. The wall 326 is formed by the first retainer ring 317 and the seal 312, which are in the stationary portion 307 of the gas turbine engine. The area of the quiescent zone 330 may extend radially inward from the base 332 of the oil capture cavity 304 to the sealing surface 313 and from the wall 326 to an opposing wall 321 formed by the annular structure 334. Accordingly, the quiescent zone 330 may be created by the flow of pressurized air being strategically directed by the nozzle 320 into oil capture cavity 304. The pressurized flow of air is strategically directed by the nozzle 320 to define the position of the quiescent zone 330 as being in the non-rotational portion 307 of the gas turbine engine. The oil capture cavity 304, however, is defined by both the rotational portion 305 and the non-rotational portion 307 of the gas turbine engine in the example of FIG. 3.

In other examples, other structures, geometries and/or configurations may be present, such as flanges, lips, fins, flow channels, walls, ridges, and the like to create and/or optimize quiescent conditions in the quiescent zone 330. For example, the stationary floor 362 may extend toward the wall 326 to form a flange, or the annular structure may be formed to include the wall 326 extending from the base 332 toward the sealing surface 313. In addition, the geometry, such as the shape and size of the quiescent zone 330 may be adjusted according to the position of the nozzle 320, the velocity and directivity of the pressurized air from the nozzle 320 and other variables affecting the quiescent zone 330 by, for example, providing additional or different radii and/or angled surfaces defining the boundaries of the quiescent zone 330. The geometry of the quiescent zone 330 may be modified by, for example, modifying at least one of the rotating portion 305 or the non-rotational portion 307 that defines the oil capture cavity 304. In addition, or alternatively, the percentage of the rotating portion 305 or the non-rotational portion 307 forming the quiescent zone 330 or oil capture cavity 304 may be adjusted to optimize and/or re-shape the quiescent zone 330.

An auxiliary vent 336 is formed in the base 332 within the quiescent zone 330. In the illustrated example, the auxiliary vent 336 is in the form of a vertical throat 340 forming one or more slots, holes or orifices annularly positioned in the annular structure 334. In other examples, the auxiliary vent 336 may include a bowl similar to that illustrated in FIG. 2. The auxiliary vent 336 may be in liquid communication with an entry slot 352 formed in the bearing structure support 346. The entry slot 352 may be an annular void in liquid communication with a vent passageway 350 that includes a reservoir 351. Both the vent passageway 350 and the reservoir 351 may be formed in the bearing support 346 with a cross-sectional area large enough to accommodate any expected level of pressurized air/oil flow, and to avoid coking of surfaces in the vent passageway 350 and the reservoir 351. A flow regulator 356 may be included in the vent passageway 350, such as where the vent passageway 350 transitions to an exhaust port 358. The flow regulator 356 may regulate the flow through the auxiliary vent 336 in order to maintain the differential pressure across the seal 306 and discourage/minimize leakage of oil from the oil sump 306 into the oil capture cavity 304.

Oil that does leak from the oil sump 306 into the oil capture cavity 304 may be urged into the quiescent zone 330 created by the pressurized air, such as an air curtain of pressurized air, being directed at the wall 326 by the nozzle 320. Upon contacting the wall 326, the flow of pressurized air may be redirected to flow along the wall 326 to the base 332, where the flow of air may again be redirected to flow along the base 332 to the opposing wall 321, where the flow of air is again redirected to flow parallel with the surface of the opposing wall 321 and into the flow of air emitted by the nozzle 320 as indicated by arrow 322. Thus, the flow of pressurized air in a generally circular pattern minimizes turbulence and provides the quiescent zone 330. A circulating flow of air within the quiescent zone 330 may perform a cyclonic separation of particulate through vortex separation. Such particulate and other fluids, such as pressurized air and oil, may be urged into the auxiliary vent 336 and confined therein by the curtain of air provided from the nozzle 320.

The stream of pressurized air supplied by the nozzle 320 may also create a positive pressure at the auxiliary vent 336, which urges a flow of pressurized air (and oil or other particulate—when present) into the vent passageway 350, through the flow regulator 356 and exhaust port 350 to a destination such as a gearbox, the exhaust 110 (FIG. 1) or overboard. The vent passageway 350, including the reservoir 351 may be formed in a cast or forged bearing support structure 346 to be near the oil sump 306 such that heat may be transferred to the lubricating oil present in the oil sump 306. In the illustrated example, the vent passageway below outboard of the reservoir 351 is drilled in the bearing support structure 346, and then the entry orifice for the drill bit is plugged by a plug 347.

Figure 4:
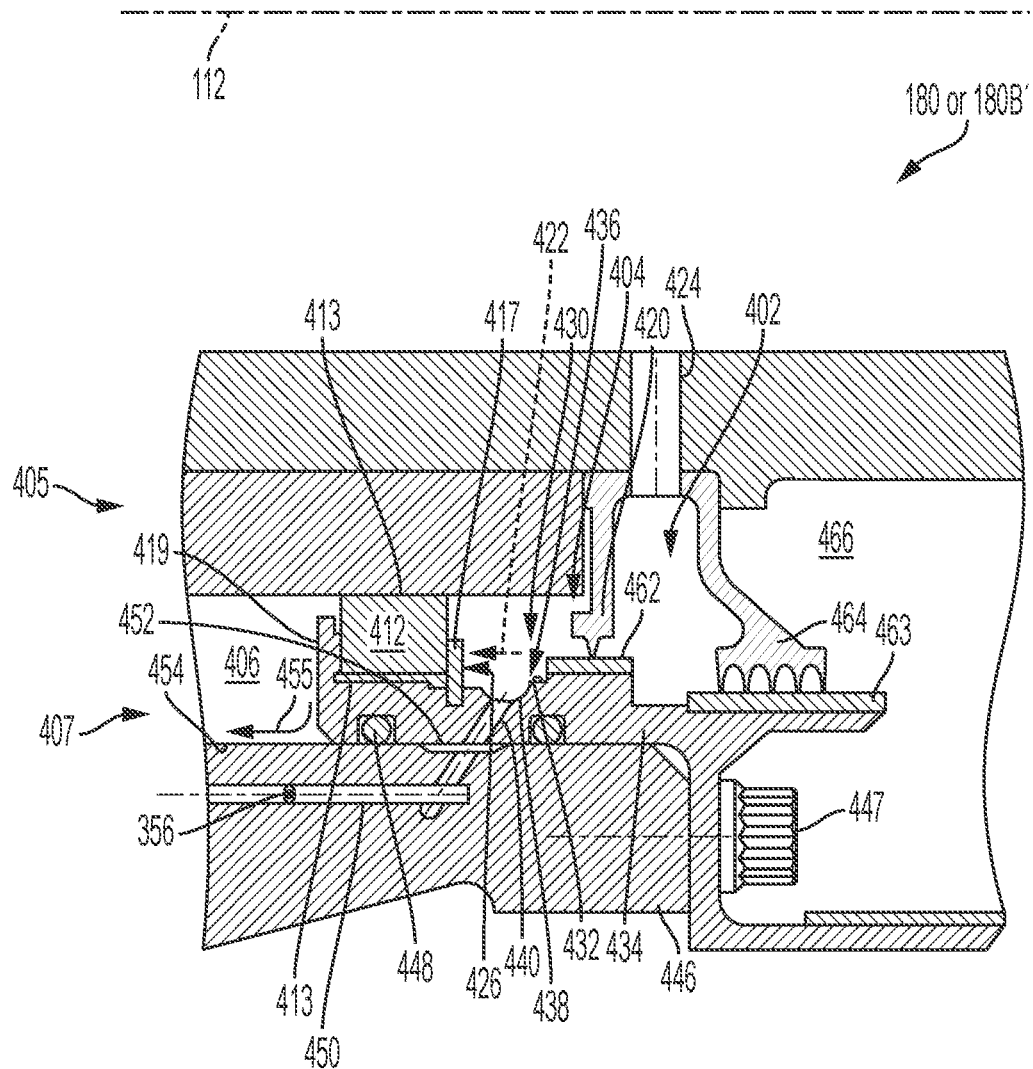
FIG. 4 is a cross-section side view of a portion of an example gas turbine engine illustrating an example of the mid sump auxiliary vent system.

FIG. 4 is a cross-section side view of a portion of an example gas turbine engine illustrating an example of a mid sump auxiliary vent system 180B (180B'). Unless otherwise indicated, the features and functionality of the rear sump auxiliary vent system 180C (FIG. 2), the front sump auxiliary vent system 180A (FIG. 3) and the mid sump auxiliary vent system 180B (180B') are similar. Accordingly, for purposes of brevity the details of these features and functionality will not be repeated, however, it should be understood that such features and functionality are fully interchangeable, combinable, and/or useable in either the mid sump auxiliary vent system (180B, 180B'), the rear sump auxiliary vent system 180C, and/or the front sump auxiliary vent system 180A, unless otherwise indicated.

The mid sump auxiliary vent system 180B includes an air chamber 402 and an oil capture cavity 404 partially formed from both a rotational portion 405 and a non-rotational portion 407 of the gas turbine engine. The oil capture cavity 404 is positioned between the air chamber 402 and a stationary oil sump 406 included in the non-rotational portion 407. A seal 412 is coupled with an annular structure 434 included in the non-rotational portion 407. The seal 412 may be a carbon seal, a labyrinth seal, or another form of mechanical seal providing a restriction of fluid flow (or fluid communication) between the oil capture cavity 404 and the oil sump 406. The oil sump 406 may supply lubricating oil to bearings (not shown) and include a scavenge line to extract oil returned to the oil sump 406 from the bearing with a scavenge pump. (not shown)

The seal 412 may be retained against a sealing surface 413 included in the rotational portion 405 of the gas turbine engine. The sealing surface 413 may be steel or ceramic or other material and may provide a low friction surface or coating against the seal 412. In some examples, the sealing surface 413 may be an abradable surface or coating. The seal 412 may be retained against the sealing surface 413. A first retaining ring 417 biases the seal 412 axially against a retainer 419 formed as part of the annular structure 434. The first retaining ring 417 is positioned between the seal 412 and the oil capture cavity 404 in the stationary portion 407. The retainer 419 is positioned in the oil sump 406 on the opposite side of the seal 412 from the first retaining ring 417. Thus, the first retaining ring 417 biases the seal 412 against the retainer 419 in a direction parallel to the central axis 112 to axially maintain the seal 412 on the annular structure 434.

The annular structure 434 is axially concentric with the central axis 112 in the non-rotational portion 407 of the gas turbine engine. O-rings 448, or some other sealing mechanism provide a seal between the annular structure 434 and a bearing support structure 446. The annular structure 434 is coupled with the bearing support structure 446, by, for example, a fastener 447. A base 432 of the oil capture cavity 404 is provided by a portion of the annular structure 434. The annular structure 434 also provides a first stationary floor 462 under a nozzle 420 and a second stationary floor 463 under a seal 464, and in contact therewith. The first and second stationary floors 462 and 463 may be abradable surfaces or coatings, facing the respective nozzle 420 and the seal 464.

The nozzle 420 is included in the rotational portion 405 and provides fluid communication between the air chamber 402 and the oil capture cavity 404. The nozzle 420 is configured and positioned to direct a stream of pressurized air (illustrated by arrow 422) into the oil capture cavity 404. The pressurized air is supplied to the air chamber 402 via an air supply line 424. Pressurized air may be supplied, for example, from one or more bleeds from the multistage air compressor 104 (FIG. 1), or some other source of pressurized air. The nozzle 420 may be a predetermined distance, such as from 0.5 mm to 15 mm, from the stationary floor 462 so as to provide a regulated flow, or velocity, of pressurized air.

The stream of air directed into the oil capture cavity 404 may be directed against a wall 426 of the oil capture cavity 404 that is opposite the location of the nozzle 420 so as to create a quiescent zone 430 in the oil capture cavity 404. The wall 426 is formed by the first retainer ring 417 and the seal 412, which are in the stationary portion 407 of the gas turbine engine. The area of the quiescent zone 430 may extend radially inward from the base 432 of the oil capture cavity 404 to the sealing surface 413 and from the wall 426 to an edge of the first stationary floor 462. Accordingly, the flow of pressurized air is directed by the nozzle 420 into oil capture cavity 404 to create the quiescent zone 430 in the non-rotational portion 407 of the oil capture cavity 404 that is radially outward from the sealing surface 413 as illustrated in the example of FIG. 4.

In other examples, other structures, geometries and/or configurations may be present, such as flanges, lips, fins, flow channels, walls, ridges, and the like to create and/or optimize quiescent conditions in the quiescent zone 430. For example, the stationary floor 462 may extend toward the wall 426 to form a flange, or the annular structure 434 may be formed to include the wall 426 extending from the base 432 toward the sealing surface 413. In addition, the geometry, such as the shape and size of the quiescent zone 430 may be adjusted according to the position of the nozzle 420, the velocity and directivity of the pressurized air from the nozzle 420 and other variables affecting the quiescent zone 430 by, for example, providing additional or different radii and/or angled surfaces defining the boundaries of the quiescent zone 430. The geometry of the quiescent zone 430 may be modified by, for example, modifying at least one of the rotating portion 405 or the non-rotational portion 407 that defines the oil capture cavity 404. In addition, or alternatively, the percentage of the rotating portion 405 or the non-rotational portion 407 forming the quiescent zone 430 or oil capture cavity 404 may be adjusted to optimize and/or re-shape the quiescent zone 430.

An auxiliary vent 436 is formed in the base 432 within the quiescent zone 430. In the illustrated example, the auxiliary vent 436 includes a bowl 438 and a throat 440. The bowl 438 may be formed as an annular notch in the annular structure 434, and the throat 440 may be formed by one or more slots, holes or orifices annularly positioned in the annular structure 434 and having a cross-sectional area less than the bowl 438.

In other examples, the bowl 438 may be omitted. The auxiliary vent 436 may be in liquid communication with an entry slot 452 formed in the bearing structure support 446. The entry slot 452 may be an annular void in liquid communication with a vent passageway 450. The vent passageway 450 may be formed in the bearing support 446 with a cross-sectional area large enough to accommodate any expected level of pressurized air/oil flow, and to avoid coking of surfaces in the vent passageway 450. A flow regulator 456 may be included in the vent passageway 450, such as where the vent passageway 450 transitions to an exhaust port (not shown). The flow regulator 456 may regulate the flow through the auxiliary vent 436 in order to maintain the differential pressure across the seal 412 and discourage/minimize leakage of oil from the oil sump 406 into the oil capture cavity 404.

Oil that does leak from the oil sump 406 into the oil capture cavity 404 may be urged into the quiescent zone 430 created by the pressurized air, such as an air curtain of pressurized air, being directed at the wall 426 by the nozzle 420. Upon contacting the wall 426, the flow of pressurized air may be redirected to flow along the wall 426 to the sealing surface 413, where the flow of air may again be redirected to flow along the sealing surface 413 to the nozzle 420, where the flow of air is again redirected into the flow of air emitted by the nozzle 420, which is indicated by arrow 422. Thus, the flow of pressurized air in a generally circular pattern minimizes turbulence and provides the quiescent zone 430. A circulating flow of air within the quiescent zone 430 may perform a cyclonic separation of particulate through vortex separation. Such particulate and other fluids, such as pressurized air and oil, may be urged into the auxiliary vent 436 and be confined therein by the curtain of air provided from the nozzle 420.

The stream of pressurized air supplied by the nozzle 420 may also create a positive pressure at the auxiliary vent 436, which urges a flow of pressurized air (and oil or other particulate—when present) into the vent passageway 450, through the flow regulator 456 and via an exhaust port to a destination such as a gearbox, the exhaust 110 (FIG. 1) or overboard. The vent passageway 450 may be formed in a cast or forged bearing support structure 446 to be near the oil sump 406 such that heat may be transferred to the lubricating oil present in the oil sump 406. In the illustrated example, the vent passageway 450 is drilled as two sections in the bearing support structure 446. In other examples, there may be additional or fewer drilled sections.

Figure 5:
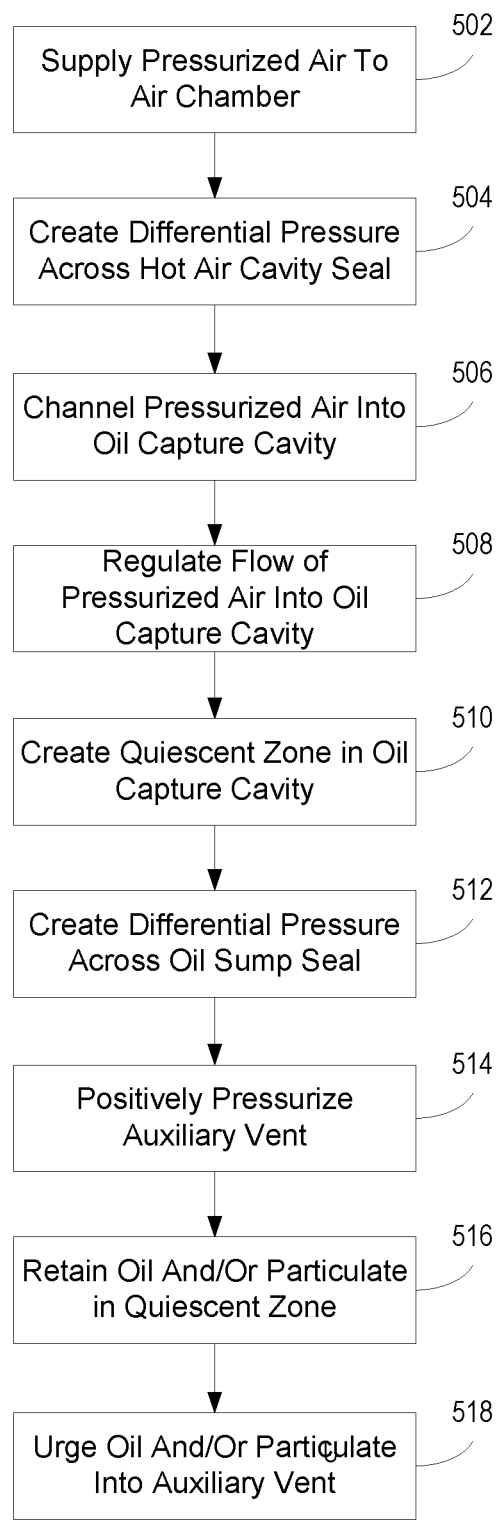
FIG. 5 is a flow diagram illustrating example operation of sump auxiliary vent system in a gas turbine engine unit.

FIG. 5 is a flow diagram illustrating example operation of sump auxiliary vent system in a gas turbine engine. The sump auxiliary vent system may be any of the rear sump auxiliary vent system 180C (FIG. 2), the front sump auxiliary vent system 180A (FIG. 3) and the mid sump auxiliary vent system 180B (180B') unless otherwise noted. For purposes of clarity in this discussion reference will be made to the rear sump auxiliary vent system 180C (FIG. 2), however is should be understood that the front sump auxiliary vent system 180A (FIG. 3) and the mid sump auxiliary vent system 1806 (180B') are interchangeably described unless otherwise noted.

Referring to FIGS. 2 and 5, during operation, pressurized air may be supplied to the air chamber 202 from the air supply line 224 and pressurize the air chamber 202. (502) The pressure in the air chamber 202 may create a differential pressure across the seal 264 (hot air cavity seal) such that the pressure in the air chamber 202 is greater than the pressure in the hot air cavity 266. (504) In addition, the pressure in the air chamber 202 is applied to the nozzle 220, which minimizes or eliminates entry of lubricating oil out of the air chamber 202. Oil that has escaped into the hot air cavity 266 through the seal 264, may, for example, cause undesirable smoke or fire. The pressurized air may also be channeled into the oil capture cavity 204 with the nozzle 220. (506) The nozzle 220 may regulate the flow, or velocity, of pressurized air into the oil capture cavity 204 to maintain a predetermined pressure in the oil capture cavity 204, such as 1-50 PSID. (508)

The flow of pressurized air from the nozzle 220 into the oil capture cavity 204 may create a quiescent zone 230 in a portion of the oil capture cavity 204 by being directed against a wall 226 of the oil capture cavity 204 and creating a circulating effect. (510) The circulating air in the quiescent zone 230 may facilitate retention of liquid, such as oil, and/or particulate, such as oil, in the quiescent zone 230. The pressurized air in the oil capture cavity 204 may also create a differential pressure across a seal 212 positioned between the oil capture cavity 204 and an oil sump 206 supplying lubricating oil to the gas turbine engine. (512) The pressure in the oil capture cavity 204 may create a differential pressure across the seal 212 (oil sump seal) such that the pressure in the oil capture cavity 204 is greater than the pressure in the oil sump 206 to avoid/minimize the infiltration of oil into the oil capture cavity 204.

The pressurized air in the oil capture cavity 204 may also positively pressurize an auxiliary vent 236 included in the quiescent zone 230. (514) The auxiliary vent 236 may provide an extra path outside of the oil sump to allow relatively small quantities of oil that leaked past the seal 212 (oil sump seal) to be captured and directed to an appropriate location. The flow capacity of the auxiliary vent 236 may be controlled by a flow regulator 256 to match with anticipated possible leakage of oil past the oil sump seal 212 so that higher pressure air is maintained on the outside of the oil sump 206 relative to the inside of the oil sump 206 to prevent/minimize oil leakage. This approach provides sufficient differential air pressure across the oil sump seal 212 to blow any oil challenging the oil sump seal 212 back into the oil wetted sump cavity 206. Oil may leak past the oil sump seal and enter buffer air cavities of the secondary air system due, for example, to seal wear.

In the event there is such oil leakage, or any other condition that results in liquid or particulate presence in the oil capture cavity 204, such materials may be retained in the quiescent zone 230 (516) and urged into the auxiliary vent 236 by the pressurized flow of air (518). The auxiliary vent 236 may channel the material to the vent passage way 250 to route oil and other particulate away from the buffer air cavities and direct it back into the oil system, overboard, to the combustor, or to a collector point, such as a collection bottle. The buffer air cavities may include engine compressor buffer air to help direct any remnant oil out of the passage. The auxiliary vent 236, depending on location in the gas turbine engine may: A) prevent oil from getting into the compressed air flow path possibly causing cabin odor issues and B) help prevent oil from entering a hot engine cavity that could contribute to hot oil firing or coking. Air/oil vented via the auxiliary vent 236 may or may not be sent thru witness media before returning to engine gearbox, oil tank, or other desired storage or use location.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

1. A system comprising:
    an air chamber comprising an inlet to receive pressurized air from a gas turbine engine;
    an oil capture cavity positioned between the air chamber and an oil sump supplying lubricating oil to the gas turbine engine;
    the oil capture cavity including an auxiliary vent formed in a base of the oil capture cavity;
    a seal separating the oil capture cavity from fluid communication with the oil sump; and
    a nozzle providing fluid communication between the oil capture cavity and the air chamber, the nozzle configured and positioned to direct a stream of the pressurized air into the oil capture cavity and against an opposite wall of the oil capture cavity to create a quiescent zone at the base of the oil capture cavity, the quiescent zone including the auxiliary vent.

2. The system of aspect 1, wherein the nozzle is configured to generate, with the stream of the pressurized air, an air curtain above the auxiliary vent between the nozzle and the opposite wall.

3. The system of aspect 1 or 2, wherein the nozzle is configured to pressurize the oil capture cavity with respect to the seal and the auxiliary vent to discourage oil flow through the seal into the oil capture cavity and encourage flow of air through the auxiliary vent.

4. The system of any of aspects 1-3, wherein the auxiliary vent is in fluid communication with a vent passageway formed in a bearing support structure of the gas turbine engine.

5. The system of aspect 4, wherein the vent passageway is positioned in the bearing support structure to extend along an outer wall of the oil sump that provides a heat exchanger function to transfer heat out of the vent passageway and into lubricating oil directed to flow along the outer wall within the oil sump.

6. The system as in any of aspects 1-5, wherein the auxiliary vent comprises a drain bowl in the base to receive lubricating oil and/or particulate.

7. The system as in any of aspects 1-6, wherein the system is a rear system in the gas turbine engine, and the opposite wall is a stationary opposing wall, wherein the seal is positioned on a flange concentrically inboard of the auxiliary vent, the flange formed perpendicular to the opposing stationary wall and inboard of a basin included in the auxiliary vent.

8. The system as in any of aspects 1-6, wherein the system is a front system in the gas turbine engine, the opposing wall is a portion of an axially rotating compressor included in the gas turbine engine, and the auxiliary vent is in fluid communication with a passageway.

9. The system as in any of aspects 1-6, wherein the system is a mid system in the gas turbine engine, and the opposing wall is a stationary portion of a bearing support structure of the gas turbine engine.

10. The system as in any of aspects 1-9, wherein the auxiliary vent is a single vent coupled with a single vent passageway that channels pressurized air out of the oil capture cavity.

11. A method comprising:
   supplying pressurized air from a gas turbine engine to an inlet of an air chamber included in the gas turbine engine;
   channeling the pressurized air into an oil capture cavity with a nozzle positioned between the air chamber and the oil capture cavity;
   regulating, with the nozzle, a flow of the pressurized air into the oil capture cavity;
   creating a quiescent zone at a base of the oil capture cavity by directing, with the nozzle, a flow of the pressurized air within the oil capture cavity against an opposing wall of the oil capture cavity;
   creating, with the pressurized air, a differential pressure across a seal positioned between the oil capture cavity and an oil sump supplying lubricating oil to the gas turbine engine, the seal separating the oil capture cavity from fluid communication with the oil sump; and
   positively pressurizing an auxiliary vent positioned in the quiescent zone at the base of the oil capture cavity with the pressurized air.

12. The method of aspect 11, wherein creating the quiescent zone comprises creating, by the nozzle, an air curtain with the flow of the pressurized air, and directing the air curtain across the auxiliary vent positioned in a base of the oil capture cavity.

13. The method of aspect 11 or 12, further comprising scavenging oil from the oil sump via a scavenge passage using a scavenge pump.

14. The method as in any of aspects 11-13, further comprising channeling pressurized air through a vent passageway to a flow regulator; and regulating a flow rate of the pressurized air through the auxiliary vent with the flow regulator.

15. The method as in any of aspects 11-14, further comprising creating, with the pressurized air, a differential pressure across a seal positioned between the air chamber and a hot air cavity, the air chamber positioned between the hot air cavity and the oil capture cavity.

16. The method of aspect 15, wherein regulating, with the nozzle, the flow of the pressurized air into the oil capture cavity comprises maintaining a predetermined pressure in the oil capture cavity to sustain the differential pressure across the seal and sustaining a predetermined flow rate of pressurized air through the auxiliary vent.

17. A system comprising:
   a vent passageway formed in a support structure of a gas turbine engine;
   an oil capture cavity in fluid communication with the vent passageway via an auxiliary vent, the oil capture cavity including a quiescent zone in a portion of oil capture cavity;
   an air chamber to receive pressurized air supplied by the gas turbine engine;
   a nozzle positioned between the air chamber and the oil capture cavity to regulate a flow of pressurized air from the air chamber into the oil capture cavity; and
   a seal positioned between the oil capture cavity and an oil sump;
   wherein the nozzle is configured to regulate the flow of pressurized air into the oil capture cavity to maintain a pressure differential between the oil sump and the oil capture cavity and a flow rate of pressurized air through the auxiliary vent and the vent passageway, and the flow of pressurize air is directed by the nozzle to maintain the quiescent zone in the oil capture cavity.

18. The system of aspect 17, wherein an area bounding the quiescent zone includes a base of the oil capture cavity, and the auxiliary vent is an opening formed in the base such that the vent passageway extends outwardly away from the base of the oil capture cavity.

19. The system of aspect 17 or 18, further comprising an annular structure coupled with the support structure, wherein the annular structure is axially aligned with the gas turbine engine and is formed to include the auxiliary vent, wherein the vent passageway included in the support structure is in liquid communication with the auxiliary vent.

20. The system as in any of aspects 17-19, wherein a portion of the oil capture cavity is formed by a rotational portion of the gas turbine engine, and a portion of the oil capture cavity is formed by a non-rotational portion of the gas turbine engine, and the quiescent zone is created in the non-rotational portion by the flow of pressurized air being directed by the nozzle.

What is claimed is:

1. A system comprising:
   an air chamber comprising an inlet to receive pressurized air from a gas turbine engine;
   an oil capture cavity positioned between the air chamber and an oil sump supplying lubricating oil to the gas turbine engine;
   the oil capture cavity including an auxiliary vent formed in a base of the oil capture cavity, the auxiliary vent including a bowl coupled with a throat, the bowl having a first predetermined diameter that is larger than a second predetermined diameter of the throat;
   a seal separating the oil capture cavity from fluid communication with the oil sump; and
   a nozzle providing fluid communication between the oil capture cavity and the air chamber, the nozzle configured and positioned to regulate and direct a stream of the pressurized air into the oil capture cavity and against an opposite wall of the oil capture cavity that extends radially outward from the base, the opposite wall having a predetermined geometry and being spaced away from the nozzle by the oil capture cavity and from the bowl by a predetermined distance, wherein the nozzle regulates the stream of the pressurized air directed to the predetermined geometry of the opposite wall such that the stream is redirected within the oil capture cavity to form a cyclonic air flow in a non-rotational portion of the oil capture cavity and create a quiescent zone at the bowl.

2. The system of claim 1, wherein the nozzle is configured to generate, with the stream of the pressurized air, an air curtain above the auxiliary vent between the nozzle and the opposite wall, wherein the predetermined geometry of the opposite wall includes a predetermined radius of curvature and the stream of the pressurized air is directed by the nozzle at the predetermined radius of curvature to create the cyclonic air flow in the oil capture cavity.

3. The system of claim 1, wherein the nozzle is configured to pressurize the oil capture cavity with respect to the seal and the auxiliary vent to discourage oil flow through the seal into the oil capture cavity and encourage flow of air through the auxiliary vent.

4. The system of claim 1, wherein the auxiliary vent is in fluid communication with a vent passageway formed in a bearing support structure of the gas turbine engine.

5. The system of claim 4, wherein the vent passageway is positioned in the bearing support structure to extend along an outer wall of the oil sump that provides a heat exchanger function to transfer heat out of the vent passageway and into lubricating oil directed to flow along the outer wall within the oil sump.

6. The system of claim 1, wherein the bowl in the base is configured to receive lubricating oil and/or particulate.

7. The system of claim 1, wherein the system is a rear system in the gas turbine engine, and the opposite wall is a stationary opposing wall, wherein the seal is positioned on a flange concentrically inboard of the auxiliary vent, the flange formed perpendicular to the opposing stationary wall and inboard of the bowl included in the auxiliary vent.

8. The system of claim 1, wherein the system is a mid system in the gas turbine engine, and the opposite wall is a stationary portion of a bearing support structure of the gas turbine engine.

9. The system of claim 1, wherein the auxiliary vent is a single vent coupled with a single vent passageway that channels pressurized air out of the oil capture cavity.

10. The system of claim 1, wherein the nozzle is positioned a distance of between 0.5 mm and 15 mm from a stationary floor forming a portion of the oil capture cavity to regulate the flow or velocity of the stream of the pressurized air directed by the nozzle into the oil capture cavity.

11. A method comprising:
supplying pressurized air from a gas turbine engine to an inlet of an air chamber included in the gas turbine engine;
channeling the pressurized air into an oil capture cavity with a nozzle positioned between the air chamber and the oil capture cavity;
regulating, with the nozzle, a flow of the pressurized air into the oil capture cavity;
directing, with the nozzle positioned a predetermined distance from a stationary portion of the oil capture cavity, a flow of the pressurized air within the oil capture cavity against an opposing wall of the oil capture cavity, the opposing wall extending inwardly away from a base of the oil capture cavity toward a central axis of the gas turbine engine and having a predetermined geometry;
redirecting the flow of pressurized air within the oil capture cavity using the predetermined geometry;
creating, with the flow of pressurized air from the nozzle and the predetermined geometry of the opposing wall, a circulating flow of the pressurized air within a non-rotational portion of the oil capture cavity;
cyclonically separating particulate from the circulating flow of the pressurized air;
creating, with the pressurized air, a differential pressure across a seal positioned between the oil capture cavity and an oil sump supplying lubricating oil to the gas turbine engine, the seal separating the oil capture cavity from fluid communication with the oil sump; and
positively pressurizing an auxiliary vent positioned in the base of the oil capture cavity with the pressurized air.

12. The method of claim 11, further comprising creating, by the nozzle, an air curtain with the flow of the pressurized air, directing the air curtain across the auxiliary vent positioned in a base of the oil capture cavity, and creating a quiescent zone in the stationary portion of the oil capture cavity defined by the base and the opposing wall.

13. The method of claim 11, further comprising scavenging oil from the oil sump via a scavenge passage using a scavenge pump.

14. The method of claim 11, further comprising channeling pressurized air through a vent passageway to a flow regulator comprising a restriction orifice in the vent passageway; and regulating a flow rate of the pressurized air through the auxiliary vent with the flow regulator.

15. The method of claim 11, further comprising creating, with the pressurized air, a differential pressure across a seal positioned between the air chamber and a hot air cavity, the air chamber positioned between the hot air cavity and the oil capture cavity.

16. The method of claim 15, wherein regulating, with the nozzle, the flow of the pressurized air into the oil capture cavity comprises maintaining a predetermined pressure in the oil capture cavity to sustain the differential pressure across the seal positioned between the air chamber and the hot air cavity and sustaining a predetermined flow rate of pressurized air through the auxiliary vent.

17. A system comprising:
a vent passageway formed in a support structure of a gas turbine engine, the vent passageway including a flow regulator, wherein the flow regulator comprises a restriction orifice in the vent passageway;
an oil capture cavity in fluid communication with the vent passageway via an auxiliary vent, the oil capture cavity including a quiescent zone in a non-rotating portion of oil capture cavity, wherein the oil capture cavity is defined by a rotational portion and non-rotational portion of the gas turbine engine;
an air chamber to receive pressurized air supplied by the gas turbine engine;
a nozzle positioned between the air chamber and the oil capture cavity to regulate a flow of pressurized air from the air chamber into the oil capture cavity; and
a seal positioned between the oil capture cavity and an oil sump;
wherein the nozzle is configured to regulate the flow of pressurized air into the oil capture cavity to maintain a pressure differential between the oil sump and the oil capture cavity and a flow rate of pressurized air through the auxiliary vent and the vent passageway, and the flow of pressurize air is directed by the nozzle to maintain the quiescent zone in the oil capture cavity, and
wherein the nozzle is positioned a predetermined distance from the non-rotating portion of the oil capture cavity such that the nozzle directs the flow of pressurized air to make contact with an opposite wall of the oil capture cavity, the opposite wall having a predetermined geometry, so that the flow of pressurized air from the nozzle is redirected to circulate the flow of pressurized air to create a cyclonic effect in the non-rotating portion of oil capture cavity, wherein the quiescent zone is bounded by an area at a base of the oil capture cavity that includes the auxiliary vent.

18. The system of claim 17, wherein an area bounding the quiescent zone includes the base of the oil capture cavity, and the auxiliary vent is an opening formed in the base such that the vent passageway extends outwardly away from the base of the oil capture cavity.

19. The system of claim 17, further comprising an annular structure coupled with the support structure, wherein the annular structure is axially aligned with the gas turbine engine and is formed to include the auxiliary vent, wherein the vent passageway included in the support structure is in liquid communication with the auxiliary vent.

* * * * *